Feb. 18, 1964
W. G. McKENZIE
3,121,475
LUBRICATOR
Filed April 23, 1962
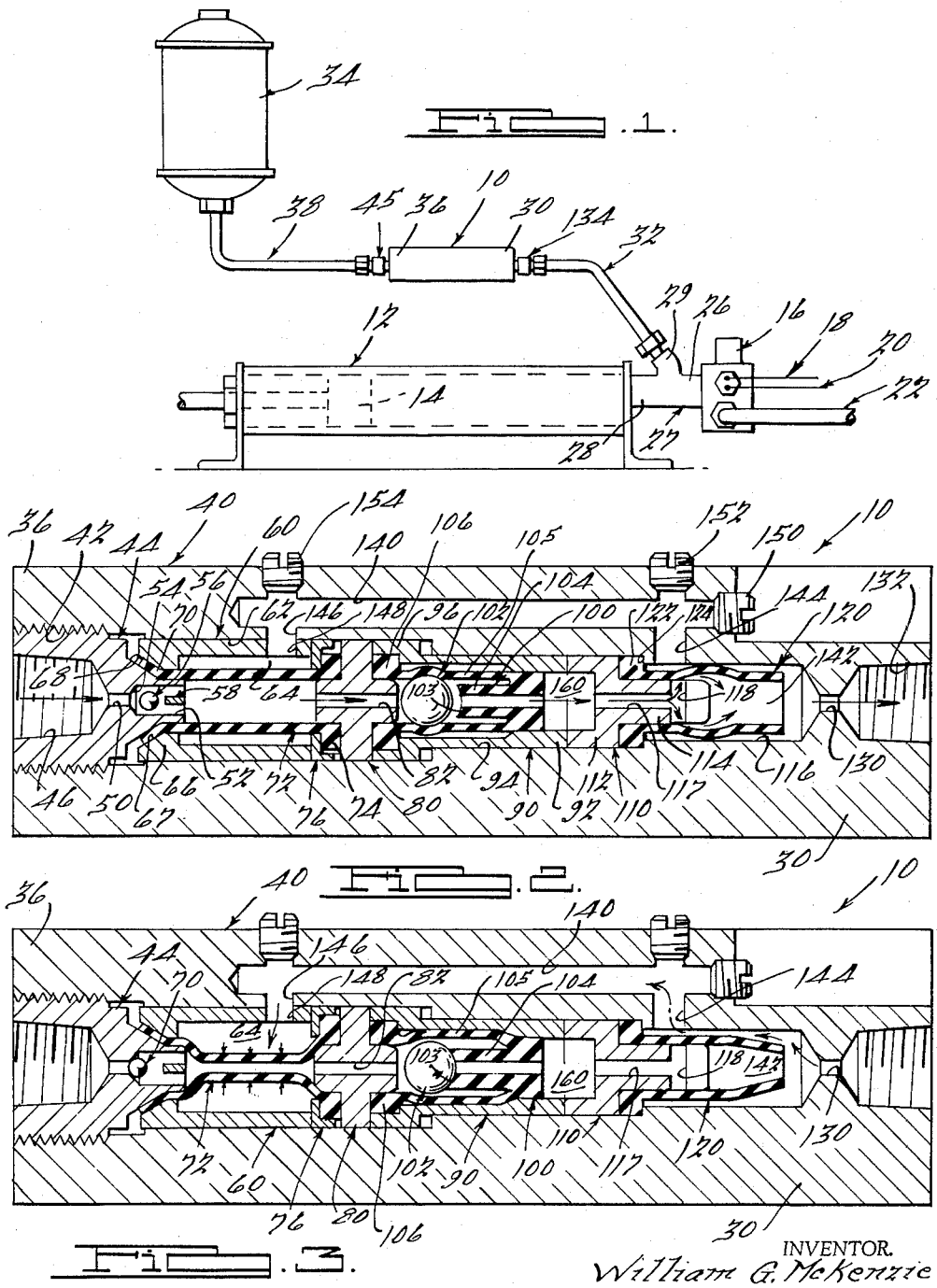
INVENTOR.
William G. McKenzie
BY
Harness, Dickey & Pierce
ATTORNEYS 3,121,475
LUBRICATOR
William G. McKenzie, Racine, Wis., assignor to Walker Manufacturing Company, Racine, Wis., a corporation of Delaware
Filed Apr. 23, 1962, Ser. No. 189,521
1 Claim. (Cl. 184—7)

This invention relates generally to lubricators and more particularly to an improved automatic differential pressure operated lubricator suitable for use with, for example, air operated cylinders.

Lubrication of air operated cylinders and similar mechanisms requires positive metering of the lubricant to the cylinder or device in order to preclude excessive wear and proper sealing of the cylinder, yet preclude lubricant accumulation within the cylinder. Such a lubricator is preferably relatively simple in construction and operation, economical to manufacture and not susceptible to failure due to malfunction.

A lubricator in accordance with an exemplary constructed embodiment of the instant invention satisfies the above requirements to a heretofore unknown degree since it is positive in operation, contains a minimum number of moving elements, is relatively easily fabricated, and is relatively easy to install in, for example, an air operated system.

A lubricator in accordance with the instant invention features a resilient pump that collapses in response to an air pressure differential thereacross. Suitable valves are connected to the pump chamber to meter a predetermined quantity of lubricant into the air-operated system upon each actuation of, for example, an air-operated cylinder.

Accordingly, one object of the instant invention is an improved lubricator.

Other objects and advantages of the instant invention will be apparent in the following description, claim and drawing, wherein:

FIG. 1 is a side elevational view of the lubricator in operative association with an air actuated cylinder.

FIG. 2 is a vertical cross-sectional view taken longitudinally through the lubricator showing the components thereof in the oil discharge condition, and, FIG. 3 is a cross-sectional view similar to FIG. 2 showing the lubricator in the pumping condition.

A lubricator 10, in accordance with an exemplary constructed embodiment of the instant invention, is shown in operative association with an air operated cylinder 12 having a piston 14 that is movable axially thereof upon the input of air as controlled by a suitable solenoid valve 16. The solenoid valve 16 is electrically controlled from a remote station (not shown) through conductors 18 and 20. Air under pressure is conducted to the solenoid valve 16 from a suitable source (not shown) as by a conduit 22. The valve 16 is connected to one end 26 of a suitable T-connector 27, the other end 28 of which is connected to the cylinder 12. The T-connector 27 has an oil inlet nipple 29 thereon that is coupled to an outlet end 30 of the lubricator 10 through a conduit 32. A lubricant reservoir 34 of the gravity feed type is connected to an inlet end 36 of the lubricator 10 as by a conduit 38.

As best seen in FIG. 2 of the drawings, the lubricator 10 comprises a generally tubular housing 40 having a longitudinally extending threaded bore 42 at the inlet end 36 thereof for the acceptance of an inlet end fitting 44. The fitting 44 has a threaded internal bore 46 for the acceptance of a conventional tube fitting 45 (FIGURE 1) thereby to sealably secure the conduit 38 to the lubricator 10.

The end fitting 44 has a central bore 50 therein communicating with a relatively larger coaxial bore 52. A truncated conical valve seat 54 extends between the bores 50 and 52 for seating of a ball check valve 56. The check valve 56 is retained in the bore 52 as by a transverse stop 58.

A sleeve 60 is disposed within a complementary bore 62 in the housing 40 so as to define the outer wall of an air chamber 64. The sleeve 60 has a radially inwardly extending shoulder 66 having a truncated conical end face 67 thereon which, in conjunction with a complementary truncated conical section 68 on the end fitting 44, retains an end portion 70 of a resilient pumping sleeve 72 in sealing engagement. An opposite end portion 74 of the sleeve 72 is retained in sealing engagement between a washer 76 and a metering disc 80. The metering disc 80 has a central bore 82 to facilitate the passage of lubricant, as will be described.

A meter support sleeve 90 has one end portion 92 disposed in a complementary bore 94 in the housing 40 and an opposite end 96 disposed in the bore 62. A resilient meter 100 is disposed within the sleeve 90 and comprises a ball 102 housed within and adapted to be seated on a complementary seat 103 on an elastic generally tubular portion 104. The tubular portion 104 of the meter 100 is surrounded by a resilient sleeve 105 having an end flange 106 sealably retained between the disc 80 and sleeve 90. The meter 100 is disposed centrally of the sleeve 90 to effect metering of a quantity of lubricant through the lubricator 10, as will be described. The meter 100 is more fully described in my copending applications Serial No. 799,787, filed March 16, 1959, now Patent 3,051,263, for Lubricating System, and Serial No. 841,500, filed September 22, 1959, now abandoned, for System.

A lubricant discharge sleeve 110 has an inner end portion 112 disposed in the bore 94 and an outer end 114 extending into a relatively smaller bore 116 in the housing 40. A central bore 117 in the sleeve 110 communicates with a radial bore 118 therein that is normally closed by a resilient sleeve valve 120. An inner end portion 122 of the valve 120 is sealably retained between the end portion 112 of the sleeve 110 and a shoulder 124 between the bores 94 and 116.

The housing 40 has a discharge aperture 130 therein communicating with a threaded bore 132 for the acceptance of a tube fitting 134 (FIGURE 1) to facilitate coupling of the conduit 32 to the lubricator 10.

The housing 40 is provided with a longitudinally extending bore 140 that is spaced radially outwardly from the axially aligned bores 62, 94 and 116 therein so as to function as a passage between the air chamber 64 and a cavity 142 defined by the bore 116. A radial bore 144 extends between the bores 116 and 140 and a radial bore 146 communicates with a complementary bore 148 in the sleeve 60, so as to provide for communication between the bore 140 and the air chamber 64. Suitable plugs 150, 152 and 154 close the bores 140, 144 and 146, respectively.

As seen in FIG. 3, when the solenoid valve 16 (FIGURE 1) is opened, air under pressure enters the T-connector 27, and is directed both to the air cylinder 12 and up the conduit 32 to the lubricator 10. Air enters through the aperture 130 into the cavity 142, thence through the bores 144, 140, 146 and 148 into the air chamber 64, where the pressure causes the resilient pumping chamber defined by the sleeve 72 to collapse, as shown. As the sleeve 72 collapses, pressure is generated on the oil interiorly thereof to cause the ball valve 56 to move against its seat 54, stopping any flow of oil back to the reservoir 34. Collapse of the resilient sleeve 72 due to air pressure in the air chamber 64 then forces oil to flow through the bore 82 and into the meter 100. The operation of the meter 100 is covered in my applications Serial Nos. 799,787 and 841,500. As more particularly set forth therein, an increase in oil pressure internally of the meter 110 concomitantly forces the ball valve 102 against its complementary seat 103, and effects expansion of the outer sleeve portion 105 which, in turn, reduces the volume of a discharge chamber 160.

As can be seen by comparing FIGS. 2 and 3, the pressure in the discharge chamber 160 is relatively higher when the lubricator 10 is in the condition shown in FIG. 3, than when in the condition shown in FIG. 2, this being due to the expansion of the outer wall portion 105 of the meter valve 100 when pressure is applied thereto.

When the air pressure is relieved on the lubricator 10, the meter 100 contracts to the condition shown in FIG. 2 and meters a small quantity of oil into the discharge chamber 160. Each time pressure is applied to the lubricator 10, the meter 100 delivers a small quantity of oil into the cavity 160. Ultimately, the volume of oil and therefore the oil pressure in the cavity 160 becomes sufficiently high to overcome the resilience of the sleeve valve 120 and a small quantity of oil will flow into the cavity 142.

During the normal operation of the lubricator 10, air will be delivered into and exhausted from the lubricator 10. Thus, it can be readily seen that any oil deposited in the cavity 142 will be carried down the conduit 32 by the exhaust air and gravity into the T-connector 27, where it will be blown into the air cylinder 12 each time the solenoid valve 16 is actuated.

It is to be understood that the specific constructions of the improved lubricator herein disclosed and described are presented for the purpose of explanation and illustration and are not intended to indicate limits of the invention, the scope of which is defined by the following claim.

What is claimed is:

A lubricator for air cylinders and the like comprising a tubular housing, a resilient compressible pump chamber within said housing, an oil inlet in said chamber, an oil inlet valve for closing said oil inlet, an air inlet in said housing communicating with the exterior of said pump chamber, said pump chamber being compressible upon the introduction of air at relatively high pressure through said air inlet, a discharge chamber in said housing, a resilient expandable oil meter between said pump and discharge chambers having an oil inlet communicating with the interior of said pump chamber and an oil outlet, said meter having an oil outlet valve movable to a closed condition upon contraction of said pump chamber, said oil meter being expandable upon contraction of said pump chamber to effect a reduction in the volume of said discharge chamber, and a normally closed resilient discharge valve having one side in communication with air inlet and another side in communication with said discharge chamber for precluding the introduction of high pressure air into said discharge chamber, said discharge valve being openable upon an increase in oil pressure in said discharge chamber to control the discharge of oil.

References Cited in the file of this patent

UNITED STATES PATENTS

| | | |
|---|---|---|
| 2,637,413 | Fox et al. | May 5, 1953 |
| 2,812,716 | Gray | Nov. 12, 1957 |
| 2,991,846 | Bystricky et al. | July 11, 1961 |

FOREIGN PATENTS

| | | |
|---|---|---|
| 1,219,992 | France | Dec. 28, 1959 |